United States Patent [19]

Riley

[11] Patent Number: 5,290,133

[45] Date of Patent: Mar. 1, 1994

[54] BALE HANDLING APPARATUS AND CARRIAGE

[76] Inventor: Brent W. Riley, R.R. 1, Box 203, Spearfish, S. Dak. 57783

[21] Appl. No.: 20,569

[22] Filed: Feb. 22, 1993

[51] Int. Cl.$^5$ ............................................. B60P 3/00
[52] U.S. Cl. ............................. 414/24.5; 414/703; 414/920; 280/507
[58] Field of Search ................. 414/920, 24.5, 24.6, 414/703, 740; 280/507, 511

[56] References Cited

U.S. PATENT DOCUMENTS

| | | |
|---|---|---|
| 3,934,726 | 1/1976 | Martin . |
| 3,974,926 | 8/1976 | Kopaska . |
| 3,985,246 | 10/1976 | Seymour ...................... 414/24.5 X |
| 4,092,050 | 5/1978 | Sobeck ............................. 298/18 |
| 4,367,062 | 1/1983 | Duenow ...................... 414/740 X |
| 4,459,075 | 7/1984 | Eichenberger ................ 414/24.5 |
| 4,580,843 | 4/1986 | Lund ......................... 414/24.5 X |
| 5,087,064 | 2/1992 | Guhlin ............................ 280/507 |
| 5,123,800 | 6/1992 | Druse, Sr. .................. 414/24.5 X |
| 5,178,505 | 1/1993 | Smith ......................... 414/920 X |

FOREIGN PATENT DOCUMENTS

| | | | |
|---|---|---|---|
| 3409516 | 9/1985 | Fed. Rep. of Germany ...... 414/920 |
| 2199012 | 6/1988 | United Kingdom ............... 414/24.5 |

*Primary Examiner*—Cheryl L. Gastineau

[57] ABSTRACT

A material handling apparatus for use in lifting and transporting relatively large items, particularly rolled hay bales, is provided. The apparatus includes a grapple-like lifting component having a frame, an upper fork set and a bottom fork set. Both sets of forks are movable relative to the frame and to each other, their movement actuated by a single, floating, double-acting hydraulic piston and cylinder arrangement. The lifting component is designed to be connected to a typical 3-point hitch of a farm machine (a tractor or the like) and includes another integral hitch structure attached to the frame for connecting a carriage component. The carriage component consists of a generally U-shaped bale receiving basket pivotally attached to a wheeled trailer-like frame. The basket is held in a bale receiving position by latches spaced along the length of the frame. When the latches are released, basket tips and the bales roll from the carriage.

15 Claims, 4 Drawing Sheets

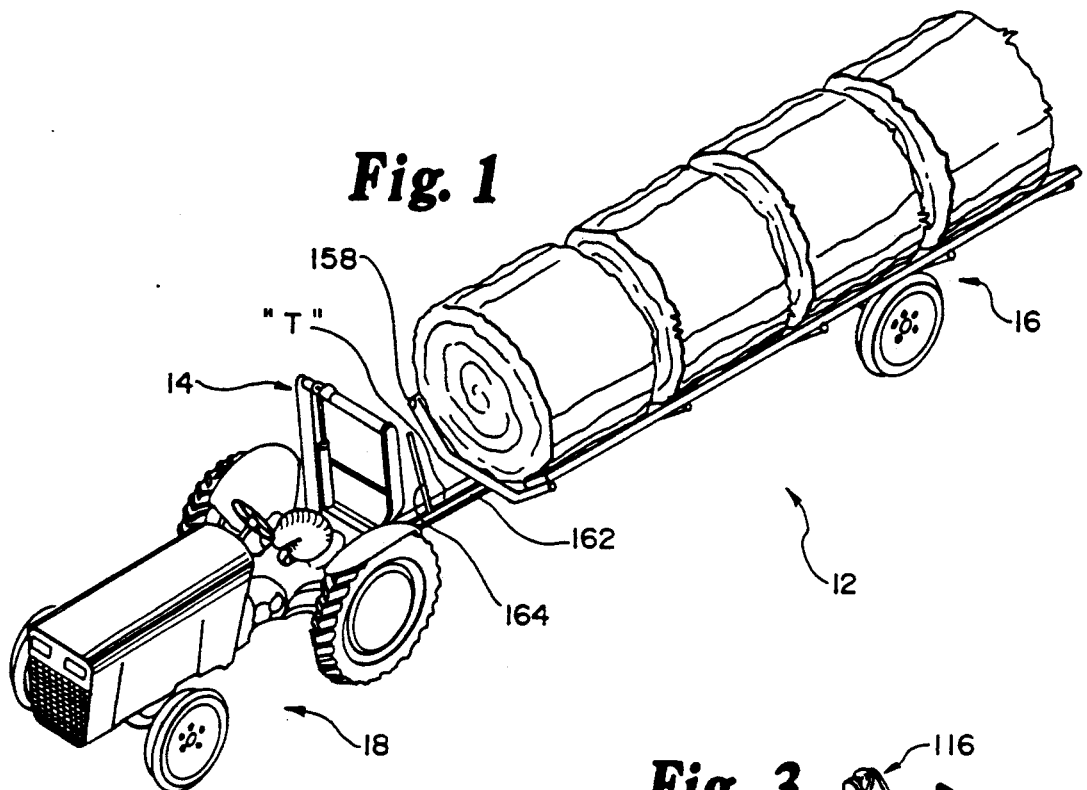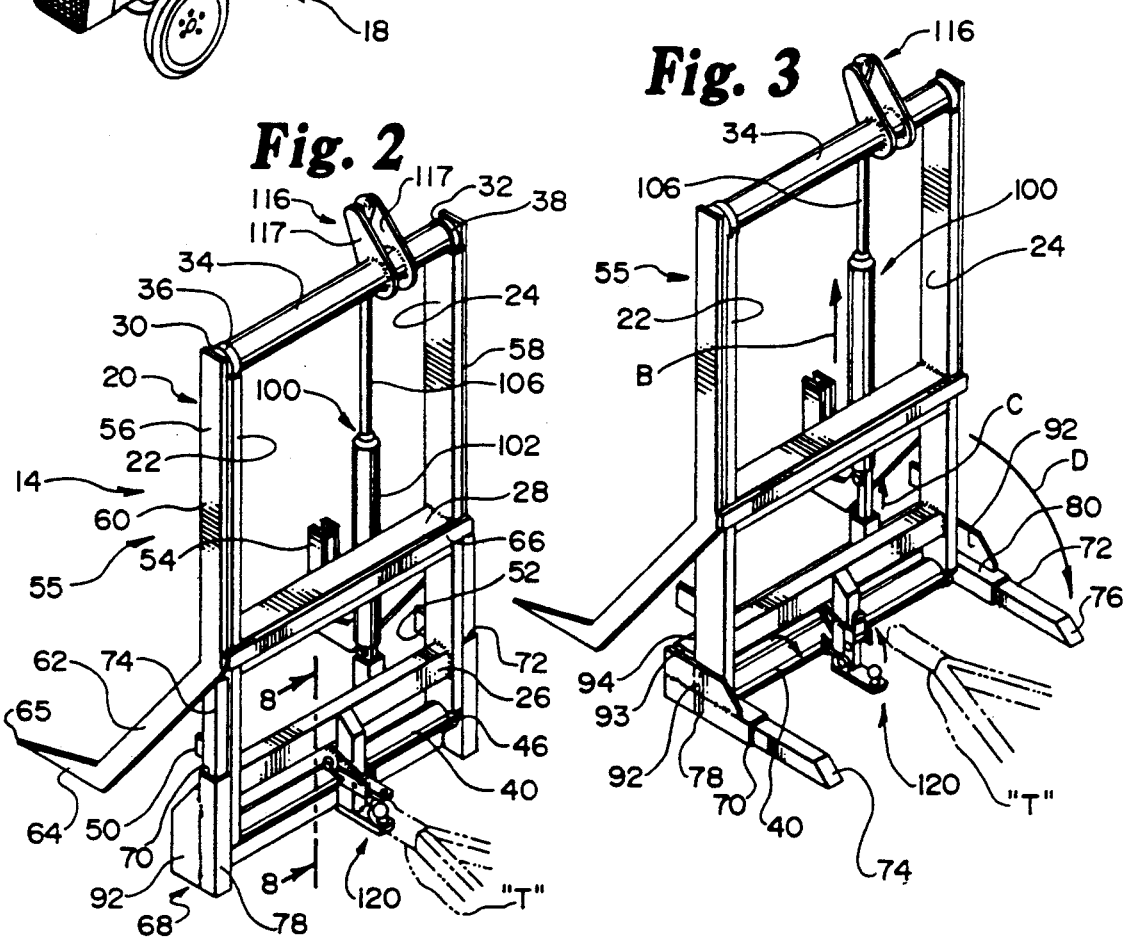

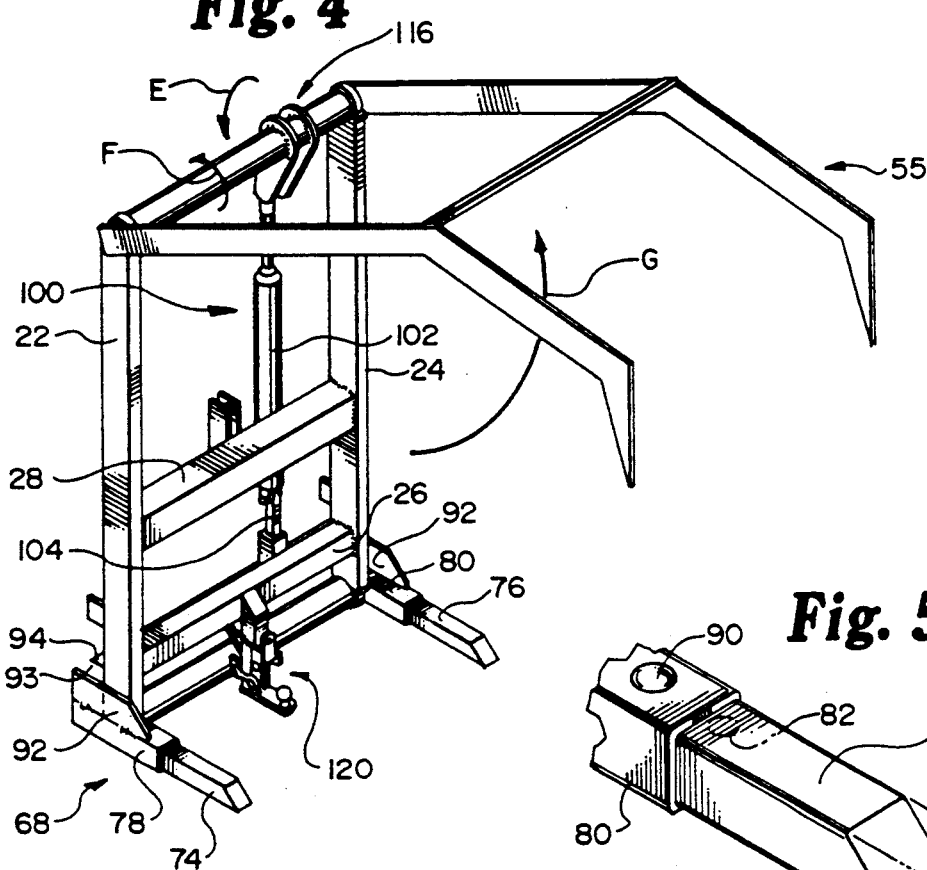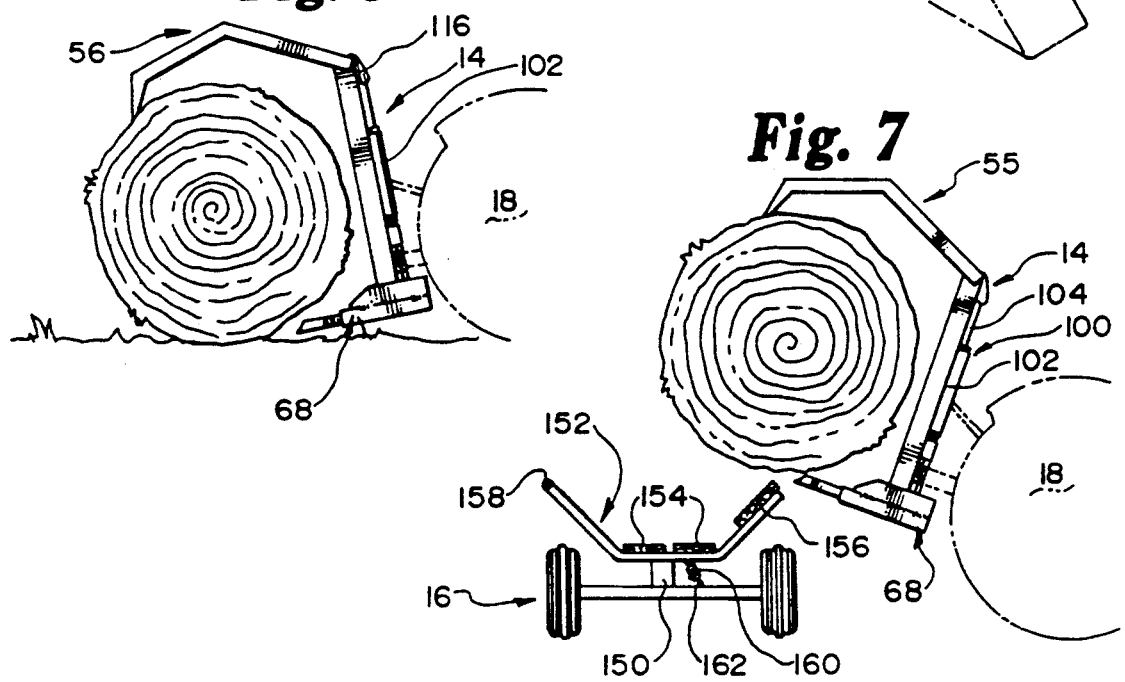

BALE HANDLING APPARATUS AND CARRIAGE

TECHNICAL FIELD

The present invention relates to agricultural implements and, more particularly, to material handling devices for manipulating and transporting bales of forage crops or other large objects.

BACKGROUND OF THE INVENTION

A recent development in farming has been the increased use of relatively large rolled bales of forage crops such as hay. The bales are typically five to eight feet in diameter and weigh approximately 1,000 to 3,000 pounds.

Material handling fork lift vehicles are well known, and there are numerous patents disclosing devices designed for manipulating and transporting the large round bales of forage crops. For example, U.S. Pat. No. 3,934,726 (to Martin) discloses a bale carrier for connection to the three point hitch of a tractor. The Martin carrier includes a pair of concentric pipes, an inner second pipe rotatably mounted in an outer first pipe, and a support frame. A tine is secured to each end of the second pipe for piercing engagement with a hay bale. The frame extends upwardly from the first pipe and a hydraulic cylinder is mounted on the frame to operate a single hook arm for engaging the upper portion of a bale.

Unlike the present invention, the hydraulic cylinder associated with the Martin carrier operates only the single, short upper arm; the lower tines must be moved into their bale-piercing position by hand. Additionally, the Martin carrier requires a bale to be pierced by the tines and, thus, there is no way simply to dump a bale into a carriage or transport vehicle. Rather, the Martin device requires that the bottom of a bale be brought into contact with a trailer surface or the ground to create enough friction to slide it off the tines. This piercing and removal process is hard on all the equipment involved.

Another bale retrieving and transporting apparatus is disclosed in U.S. Pat. No. 3,985,246 (Seymour). The Seymour retrieving and transporting apparatus includes a lower supporting structure consisting of tines adapted to be inserted under bale, a rear supporting structure, basically a frame, and a bale discharging means comprising a hydraulically operated arm for pushing a bale from the tines. The tines are fixedly mounted on the frame, and the Seymour apparatus does not include any means for contacting the upper portion of a bale to securely hold it while it is being transported.

Other rolled bale transportion devices are disclosed in U.S. Pat. Nos. 3,974,926 (Kopaska) and 4,459,075 (Eichenberger). The transporter disclosed by Kopaska, like that disclosed by Martin, relies upon frictional contact with the ground to remove a bale. The Eichenberger loading device is a trailer to which is attached a long, articulated, hydraulically operated pivoting arm for gripping and lifting the bales onto the trailer.

U.S. Pat. Nos. 4,092,050 (Sobeck), 4,580,843 (Lund) and 5,123,800 (Druse, Sr.) disclose bale carriers or rack assemblies, basically modified trailers, for transporting rolled bales. None of the latter three patents discloses means for picking up bales and loading them onto the carriers, nor is there any suggestion that such carriers or rack assemblies can be connected directly to bale lifters.

Despite the advancements and improvements in the art concerning the lifting and moving of relatively large rolled bales of material or other items, there still are some significant problems. For example, solid items can not be pierced, and if a bale is pierced as suggested in the Martin patent, there is no way simply to dump the bale from the lifter. Another problem is that the bales or material to be lifted may vary in size and, even in those patented devices with an arm or clamp for contacting the upper portion of a bale, e.g., the Martin or Kopaska devices, respectively, the arm or clamp is very short and has only a limited range of motion.

While the patent to Martin suggests that lower tines may be foldable to a storage position, the tines must be moved by hand. The Martin patent suggests that the Martin carrier does not interfere with the normal towing use of the tractor when the lower tines and the upper arm are positioned in nonworking positions, but there is no suggestion about how to couple a carriage of the general type disclosed in the Sobeck, Lund or Druse, Sr. patents to a bale manipulator so that two devices can be used in combination conveniently and safely.

SUMMARY OF THE INVENTION

A material handling apparatus especially for use in lifting and transporting relatively large rolled hay bales is provided. The handling or lifting component of the present invention is a four tined, quadruple fork, grapple-like device having a frame that supports movable upper and lower forks. The upper fork comprises two long, generally arcuate, upper grapple holding tines and the lower fork comprises two relatively shorter, substantially straight, bottom grapple support tines. Both sets of tines are movable relative to the frame and to each other, their sequential movement being actuated and controlled by a single, floating, double-acting hydraulic piston and cylinder arrangement. The lifting implement is designed to be connected to a typical three point hitch of a farm machine (a tractor or the like) and includes another integral hitch structure attached to the frame.

The carriage component of the present invention consists of a generally U-shaped bale basket pivotally attached, at an offset pivot point, to brackets fixedly mounted on a beam, in turn mounted along the longitudinal span of a typical wheeled trailer-like frame. The basket is held in a bale receiving position above the beam by five basket latches spaced along the length of the basket. The latches are operably connected by a continuous linkage member, in turn connected to a hand lever at the front of the carriage. When the latches are released by moving the hand lever, the offset mounting of the basket causes it to tip sideways, whereby the bales are rolled from the carriage.

One of the objects of the present invention is to provide a agricultural implement for manipulating and transporting relatively large items such as bales of forage crops.

Another object of the present invention is to provide an agricultural implement for moving large rolled bales of forage crops, whereby the implement includes a bale gripping and lifting means and a bale receiving carriage means, wherein the lifting and carriage means can be used in conjunction with a single agricultural implement such as a tractor to pick up and transport large rolled bales of forage material efficiently and conveniently.

A feature of the present invention is that the grapple or lifting component of the invention includes an integral hitch means whereby the carriage component of the present invention may be securely coupled thereto, yet conveniently released therefrom.

In one embodiment of the present invention, the quadruple fork lifting component is used cooperatively in conjunction with the carriage component, but the two components may be used separately. A feature of the present invention is that the carriage may be operated to discharge bales carried thereon by actuating the means for operating the lifting component, whereby the operator of the tractor can discharge bales from the carriage without leaving the tractor.

Yet another object of the present invention is to provide a agricultural implement for manipulating relatively large round rolled bales of hay wherein the implement includes a generally rectangular support frame, bottom bale engaging fork for engaging and partially supporting a bale, top bale engaging fork for engaging the upper portion of the bale, and hydraulic piston and cylinder means or arrangement for deploying or moving the bottom and top fork sequentially, whereby an operator of the implement does not have to deploy either the bottom or top bale engaging fork by hand.

Further objects, features and advantages of the present invention will be understood with reference to the following specification and to the appended drawings and claims.

BRIEF DESCRIPTION OF THE DRAWINGS

FIG. 1 is a pictorial perspective view of the bale handling apparatus and carriage of the present invention in use with a tractor;

FIG. 2 is a perspective view of the bale handling apparatus of the present invention;

FIG. 3 is a view similar to that of FIG. 2, including arrows depicting the motion of portions of the bale handling apparatus of the present invention;

FIG. 4 is a perspective view similar to that of FIGS. 2 and 3 depicting the movable portions of the bale handling apparatus of the present invention in another position;

FIG. 5 is an enlarged fragmentary perspective view of one of the lower tines of the bale handling apparatus;

FIG. 6 is a elevational view of the bale handling apparatus of the present invention opened for grasping a bale;

FIG. 7 is a similar elevational view of the present invention with a bale supported therein, and including the carriage component of the present invention ready to receive a bale;

DETAILED DESCRIPTION OF THE PREFERRED EMBODIMENT

FIG. 1 depicts a land vehicle 12 including the "quadfork" bale handling apparatus 14 and the bale carriage 16 of the present invention. The land vehicle 12 includes a typical farm tractor 18, but any vehicle adapted for use with agricultural implements, i.e., with a three point hitch mechanism and a remote hydraulic system, may be used with the bale handling apparatus 14 and the carriage 16 of the present invention.

Figure 10:
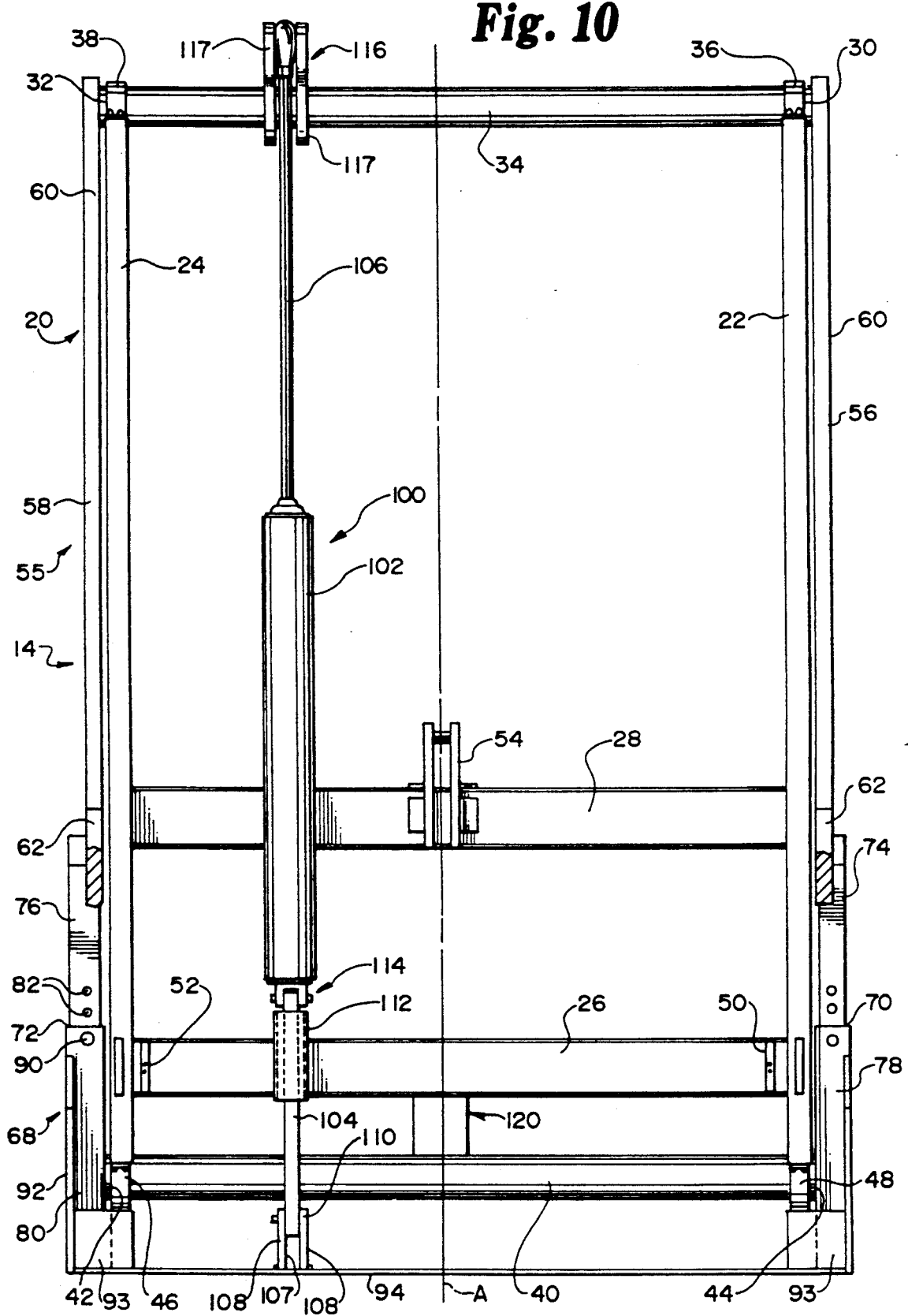
FIG. 10 is an elevational view of the bale handling apparatus of the present invention.

Referring to FIGS. 2 and 10, the bale handling apparatus 14 of the present invention has a generally rectangular substantially rigid support frame 20 including generally vertical elongated side columns 22, 24 and generally horizontal transversely extending lower and central cross-members 26, 28, respectively. Longitudinal and transverse orientations, as well as vertical and horizontal orientations, of components or portions of the bale handling apparatus 14 and carriage 16 of the present invention are made with reference and respect to the bale handling longitudinal axis, depicted as line A in FIG. 10, and to the bale handling apparatus 14 itself when attached to a tractor 18 as depicted in FIG. 1.

A rotatable axle 34 is supported adjacent to the upper ends of the side columns 22, 24. The axle 34 has journal ends 30, 32 received in bushings 36, 38 integrated with or attached to the upper ends of the columns 22, 24. Similarly, a lower axle 40 with two opposed journal ends 42, 44 is received in bushings 46, 48 carried at or adjacent to the bottom most ends of the columns 22, 24. The lower and central supporting cross members 26, 28 may be connected to the side columns 22, 24 by appropriate means including welding. Lower three point hitch connections 50, 52, respectively, are carried on the columns 22, 24 and the lower cross member 26, and the central cross member 28 carries a generally central, upper three point hitch bracket 54.

The upper axle 34 extends through the bushings 36, 38 and its ends lie outside the columns 22, 24. An upper bale engaging fork set 55 for contacting or engaging the upper region of a bale or item to be lifted includes two long parallel upper segmented or articulated claw-like tines 56, 58, each fixably connected to a respective end of the upper axle 34. Each tine 56, 58 includes a root or base segment 60 coupled to the axle 34, a medial segment 62 and a pointed free end segment 64 with a tip 65. The segments 60, 62, 64 are depicted as straight segments angularly related to each other, but it should be appreciated that the tines 56, 58 could be formed as a single, smoothly curved, arcuate member. An upper fork brace member 66 is connected to both tines 56, 58 at about one-half the distance between the root end adjacent the axle 34 and the free tip 65. The brace member 66 spans the distance between the forks 56, 58 and is generally parallel to the central support 28.

The lower axle 40 is generally parallel to the upper axle 34 and also extends transversely beyond the columns 22, 24. A lower bale engaging fork set 68 includes two substantially straight, parallel spaced lower tines 70, 72. Each of the tines 70, 72 has a sharpened tip portion 74, 76 movably or slidably received in a root sleeve 78, 80, respectively. As depicted in FIGS. 5 and 10, the tine tips 74, 76 have a plurality of in-line apertures 82 equally spaced along the length thereof, and each tine sleeve 78, 80 has a single aperture for being aligned with the apertures 82; in registration, the apertures receive a removable pin 90 for fixing the lower fork set 68 at a selected length. Each sleeve 78, 80 carries a sleeve flange gusset, both indicated at 92, and is connected through the gussets 92 to an elongated, substantially rigid, angle iron, base strap 94. The strap 94 extends or spans the transverse width of the bale handling apparatus 14, is generally parallel to the central support 28, and moves with the lower fork set 68. A stop block 93 is in or adjacent to each of the two inside corners formed by the intersection of the top of the sleeves 78, 80, the gussets 92 and the ends of the strap 94; each block 93 may be appropriately secured (e.g., welded) to any one or more of the adjacent surfaces. The blocks 93 strengthen the lower fork set 68 by reinforcing the gussets 92 and control or limit the movement of the fork set 68. When the fork set 68 is fully deployed (as shown in FIG. 3), the stop blocks 93 are in contact with the side columns 22, 24.

With continued reference to FIGS. 2 and 10, particularly FIG. 10, the bale handling apparatus 14 of the present invention includes a floating operating or actuating means, indicated generally at 100. The actuating means 100 floats in that it is connected only to the movable parts of the apparatus 14, the upper and lower axles 34, 40, respectively, and the strap 94, not to the frame 20. The actuating means 100 includes a double acting hydraulic cylinder 102, a lower connecting rod 104, and an upper hydraulic piston shaft 106. One end of the rod 104 (the lower end) has a hole and is pivotally coupled to the lower axle 40 and the strap 94 at a rod clevis coupling 107 comprising a pair of parallel flanges 108 each with a hole for receiving a conventional fastening means such as a pin 110. A connecting rod guide sleeve and cylinder stop 112 is fixably mounted to the lower cross member 26. At its second, upper end, also with a hole, the rod 104 is attached to the cylinder 102 by conventional means such as a clevis/pin arrangement 114. The upper piston shaft 106 is extensibly and retractably received in the cylinder 102 as is well known in hydraulic piston/cylinder arrangements, and is connected to an upper fork clevis 116 rigidly carried on the upper axle 34. The clevis 116 includes a pair of eccentric, spaced parallel flanges 117 fixed on the axle 34 by any suitable conventional means. The actuating means 100 is offset laterally from the central longitudinal axis of the lifting apparatus 14, and it may be conventionally coupled by hydraulic lines (not shown) to the hydraulic system (not shown) of the tractor 12.

Figure 8:
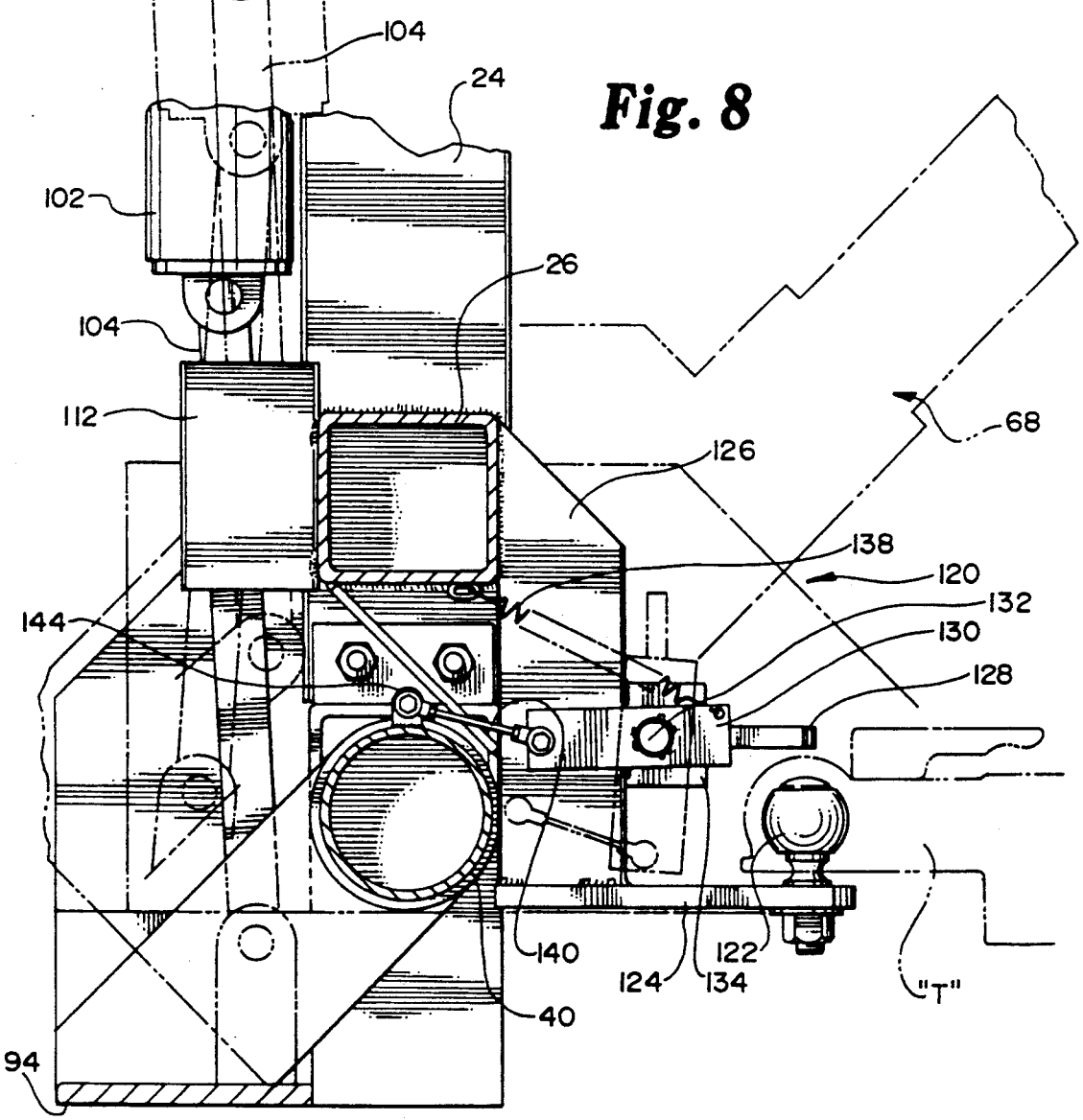
FIG. 8 is a sectional view taken along line 8—8 of FIG. 2.

Referring to FIG. 8, the lower cross member 26 acts as a support for a centrally mounted safety hitch mechanism 120. The hitch mechanism 120 includes a typical hitch ball 122 mounted on a generally horizontal hitch flange 124 connected to two vertical hitch flanges, both indicated at 126 and both secured to the hitch support cross member 26. The hitch mechanism 120 further includes a movable hitch safety retainer arm 128. The retainer arm 128 is carried by a movable pivot plate 130. The pivot plate 130 is supported by a pivot shaft 132 extending therethrough and extending generally parallel to the cross member 26 into a pivot flange 134. The pivot flange 134 is fixedly mounted to one of the hitch flanges 126. A coil spring 138 is operably connected between the free end of the pivot plate 130 and the hitch support 26. A movable, generally straight, rigid pivot strut 140 is connected to the opposite end 142 of the pivot plate 130. The other end of the pivot strut 140 is connected to an upstanding ear 144 fixedly mounted on the lower axle 40.

Figure 9:
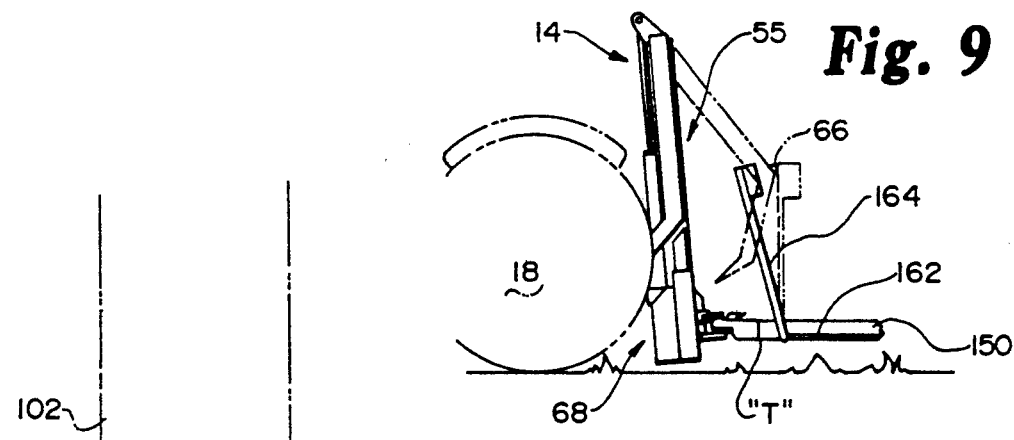
FIG. 9 is an elevational view of the present invention depicting how the bale handling apparatus and carriage thereof may be used cooperatively.

Referring to FIGS. 1 and 7, the bale carriage 16 of the present invention includes a wheeled chassis 150, with a typical tongue "T". An offset cradle-like bale holder 152 is pivotally mounted on the chassis 150. The holder 152 includes parallel elongated base boards 154 and buck boards 156 running the length thereof, and is capable of containing a plurality of hay bales as depicted in FIG. 1. At least one side of the holder 152 has an outermost guide rail 158, but both sides could have such a rail. A conventional spring-loaded latch mechanism 160 may be coupled to a rod 162 extending forwardly toward the bale handling apparatus 14 and terminating at an upstanding hand-operated trip lever 164, depicted in FIG. 9. An advantage of the present invention is also depicted in FIG. 9, wherein the bale manipulating apparatus 14, specifically the upper brace member 66 of the upper fork set 55, may be used to move the trip lever 164 to release the latch mechanisms 160, tipping bales from the carriage 16 without requiring the operator to leave the tractor 12.

Referring to FIGS. 3 and 4, the movement and range of operative positions of components of the bale handling apparatus 14 of the present invention are depicted by a plurality of arrows. In FIG. 3, the reciprocating, generally vertical motion of the actuating or operating means 100 is represented at arrow B, arrow C depicts the following movement of the connecting rod 104, and arrow D depicts the resultant deploying movement of the lower tines 70, 72. It should be appreciated that when the lower tines 70, 72 are fully deployed, i.e., generally horizontal and parallel to the ground as depicted in FIG. 3, the upper bale engaging fork set 55 has not begun to move. Referring to FIG. 4, the rod of 104 has traveled to its full extent and continued operation of the actuating means 100, further retracting the piston 106 into the cylinder 102, generates downward movement of the clevis 116 and upper axle rotation as depicted by arrows E and F, respectively. The resultant opening movement of the upper bale contacting fork set 55 is shown at arrow G.

Referring to FIG. 8, certain of the operational positions of the safety hitch mechanism 120, as well as the lower fork set 68, are depicted in phantom. As the lower fork set 68 moves from its vertical storage or transport position, through 45° or the half-deployed position, and to its generally horizontal fully-deployed position, the hitch mechanism 120, specifically the hitch safety retainer 128 is raised from its horizontal locking or retaining position closely above the hitch ball 122 and trailer or carriage tongue "T" to its generally vertical released or open position close to the flanges 126 (open position depicted in phantom).

In use, the actuating means 100 is operated to deploy the lower fork set 68, simultaneously raising the hitch safety retainer 128 so that the tongue "T" of the carriage 16 can be placed directly on the hitch ball 122 as depicted in FIG. 3. Then the actuating means 100 is operated in reverse extending the piston 106 and driving the rod 104 downwardly to raise the lower fork set 68 to its travel position, wherein the tines 70, 72 are closely adjacent and parallel to the columns 22, 24, at the same time locking the tongue "T" in place by dropping the retainer 128 to the position shown in FIGS. 2 and 8. When the piston 106 is fully extended, i.e., when the cylinder 102 is fully pressurized, the upper and lower forks 55, 68, respectively, and the safety retainer 128 are locked in their transport storage position. The entire land vehicle 12 shown in FIG. 1 may be driven to a field to pick up bales.

At the location of the bales, the carriage 16 may be dropped or released from the bale handling lifter apparatus 14 by deploying the lower fork set 68 as outlined in the preceding paragraph. The bale handling apparatus 14 is then used to load the carriage 16 with bales by continuing to retract the piston 106 until the upper fork set 55 is open fully enough along arrow G (FIG. 4) to get substantially around and grasp a bale, after aligning the apparatus 14 with a bale as shown in FIG. 6. The tractor 12 is simply moved until the lower fork set 68 is partially under the bale and the upper fork set 55 is closed by actuating means 100 until it contacts the upper portion of the bale at least at a point approximately 180° opposite the point at which the lower fork set 68 is contacting the bale (again see FIG. 6). The captured bale may be lifted as shown in FIG. 7 by raising the three point hitch mechanism. Once a bale is raised, it can be moved about and dropped in a selected place, e.g., into the carriage 16, by opening the top fork set 55 and by lowering the three point hitch if necessary. In most instances, particularly wherein round objects such as bales are being moved, because the lower fork set 68 has not pierced the object or moved completely under it, the lifted object will simply roll from the apparatus as the upper fork set 55 is opened.

After loading the carriage 16 with the desired number of bales, the carriage 16 is reconnected to the lifting apparatus 14 as outlined above, the bales are taken to a desired location and dumped, either by operating the latch release lever 164 by hand or by hitting the lever 164 with the upper fork set 55 as shown in FIG. 9.

Of course, the bale handling apparatus 14 can be used without the carriage 16 and, without using the upper fork set 55, can be used as a general material handling fork lift simply by fully deploying the lower fork set 68. All the components of the present invention may be formed from suitable material of appropriate gauges. The carriage hitch mechanism 120 may be a "ball-less" clevis type for receiving a strap-like trailer or carriage tongue and may be used to receive tillage, spraying or haying equipment. Tools in addition to tine tips 74, 76, for example longer lifting tines, blunt tines, a bucket or other tools can be fitted in sleeves 78, 80 for accomplishing various objectives.

It is contemplated that various changes, including those mentioned above, can be made without deviating from the spirit of the present invention. It is therefore desired that the foregoing description be considered as illustrative, not restrictive, and that reference be made to the appended claims to indicate the scope of the invention.

What is claimed is:

1. A vehicle mounted apparatus for moving bales, said apparatus comprising:
   a frame;
   lower bale engaging means for engaging and partially supporting one of said bales, said lower bale engaging means movably connected to said frame and movable from a storage position to a deployed position;
   upper bale engaging means for engaging an upper region of said bales, said upper bale engaging means movably connected to said frame and movable from a storage position to open and closed positions;
   means for moving said lower and upper bale engaging means, said means for moving operably connected to said lower and upper bale engaging means; and
   carriage means for receiving and transporting said bales, said frame carrying a hitch means for releasably connecting said carriage means to said frame.

2. The apparatus according to claim 1, wherein said lower bale engaging means comprises two generally straight, parallel lower tines, and wherein said upper bale engaging means comprises two generally parallel upper tines, said upper tines being longer than said lower tines.

3. The apparatus according to claim 2 and safety release means for preventing the unwanted removal of said carriage from said frame, said safety release means operably coupled to said frame.

4. The apparatus according to claim 3, wherein said upper tines are generally arcuate.

5. The apparatus according to claim 4, wherein said means for moving comprises a single double-acting hydraulic piston and cylinder arrangement.

6. An implement for lifting material, said implement comprising:
   a generally planar rectangular frame having an upper end and a lower end and including two parallel side columns with ends adjacent said upper and lower ends of said frame, said columns having apertures adjacent each end, said frame further comprising a lower axle rotatably received in the apertures adjacent the lower end of the frame, and an upper axle rotatably received in the apertures adjacent the upper end of the frame;
   an upper fork including two upper tines, each being secured to an end of said upper axle;
   a lower fork including two lower tines, each being secured to an end of said lower axle and each being straight and shorter than said upper tines; and
   actuating means for moving said upper and lower forks relative to said frame and to each other.

7. The implement according to claim 6, including hitch means for receiving a tongue of a trailer-like land vehicle, said hitch means mounted on said frame.

8. The implement according to claim 7, wherein said actuating means comprises a fluid driven piston and cylinder operably coupled to said upper and lower axles, for sequentially rotating said axles, whereby said upper and lower forks move sequentially relative to said frame and to each other.

9. The implement according to claim 8, wherein said hitch means includes a releasable safety latch operably coupled to said lower axle, whereby said safety latch is operated by said actuating means.

10. The implement according to claim 9 and said trailer-like land vehicle comprising a wheeled carriage for receiving material lifted by said implement.

11. An apparatus for lifting and transporting material, said apparatus designed to be operably carried by an agricultural implement and comprising a lifting component comprising:
   a generally planar rectangular frame having an upper end and a lower end when said lifting component is being carried by said agricultural implement, said frame including two parallel side columns with respective column ends adjacent said upper and lower ends of said frame, said columns having apertures adjacent each end, said frame further comprising at least one cross member fixed to said side columns and extending generally perpendicularly therebetween, said cross member being between said column ends and carrying a hitch, a lower axle generally parallel to said cross member and rotatably received in the apertures adjacent the lower end of the frame, and an upper axle generally parallel to said cross member and rotatably received in the apertures adjacent the upper end of the frame, each said axle having two opposed ends and extending through said apertures whereby the ends are outside said side columns;

an upper material contacting fork including two generally parallel upper tines, each said upper tine being fixedly secured to a respective one of said ends of said upper axle whereby each said upper tine lies in a plane outside and generally parallel to said side columns, and whereby, when said upper axle is rotated, said upper tines are movable in said planes from a storage and transport position to open and closed positions;

a lower material contacting fork including two generally parallel lower tines, each lower tine being straight and shorter than said upper tines and each comprising a tine tip slidably received in a tine sleeve, said tine sleeves being fixedly secured to a respective one of said ends of said lower axle whereby each said lower tine lies in a plane outside and generally parallel to said side columns, and whereby, when said lower axle is rotated, said lower tines are movable in said planes from a storage and transport position to a deployed position generally perpendicular to said frame, said lower fork further including a stop means for controlling the movement of said lower fork, said stop means having a first end fixedly secured to one of said tine sleeves and a second end fixedly secured to the other of said tine sleeves and being generally parallel to said cross member; and a fluid driven actuating means for moving said upper and lower forks relative to said frame and to each other, said actuating means comprising a double acting cylinder and piston, said piston being retractably and extensibly received in said cylinder and having a free end operably coupled to said upper axle, said actuating means further including a connecting rod having a first end connected to said cylinder and a second end operably coupled to said lower axle whereby, when said piston is retracted, said connecting rod is pulled toward said upper axle thereby first moving said lower fork to said deployed position and whereby continued retraction of said piston secondly moves said upper fork toward said open position.

12. The apparatus according to claim 11 further comprising a transporting component comprising a trailer-like wheeled chassis including a tongue for being releasably connected to said hitch, a cradle means for receiving material lifted by said lifting means, said cradle means pivotally mounted on said chassis and comprising transverse, generally U-shaped support members and parallel elongated base boards and buck boards supported by said support members, said base boards and buck boards running substantially the length of said chassis, and latch means for releasably holding said cradle upright, said latch means coupled to a latch means operating rod extending forwardly toward the lifting component and terminating at an upstanding latch means operating lever.

13. The apparatus according to claim 12, wherein said lifting component includes hitch safety means for releasably keeping said tongue connected to said hitch, said hitch safety means comprising a retainer carried by a movable pivot plate supported by a pivot shaft extending generally parallel to said cross member, said shaft supported by a pivot flange fixedly mounted to said hitch, said retainer being movable between a closed position closely above said tongue and an open position spaced from said tongue, said hitch safety means further comprising a spring means for biasing said retainer toward said open position and a movable, generally straight, rigid pivot strut having one end connected to said pivot plate and a second end fixedly connected to said lower axle whereby, when said lower fork is deployed, said retainer is in said open position.

14. The apparatus according to claim 13, wherein said upper tines are generally arcuate.

15. The apparatus according to claim 14, wherein said agricultural implement includes a three-point hitch and wherein said lifting component is designed to be connected to said three-point hitch whereby it may be raised and lowered with respect to said agricultural implement.

* * * * *